UNITED STATES PATENT OFFICE.

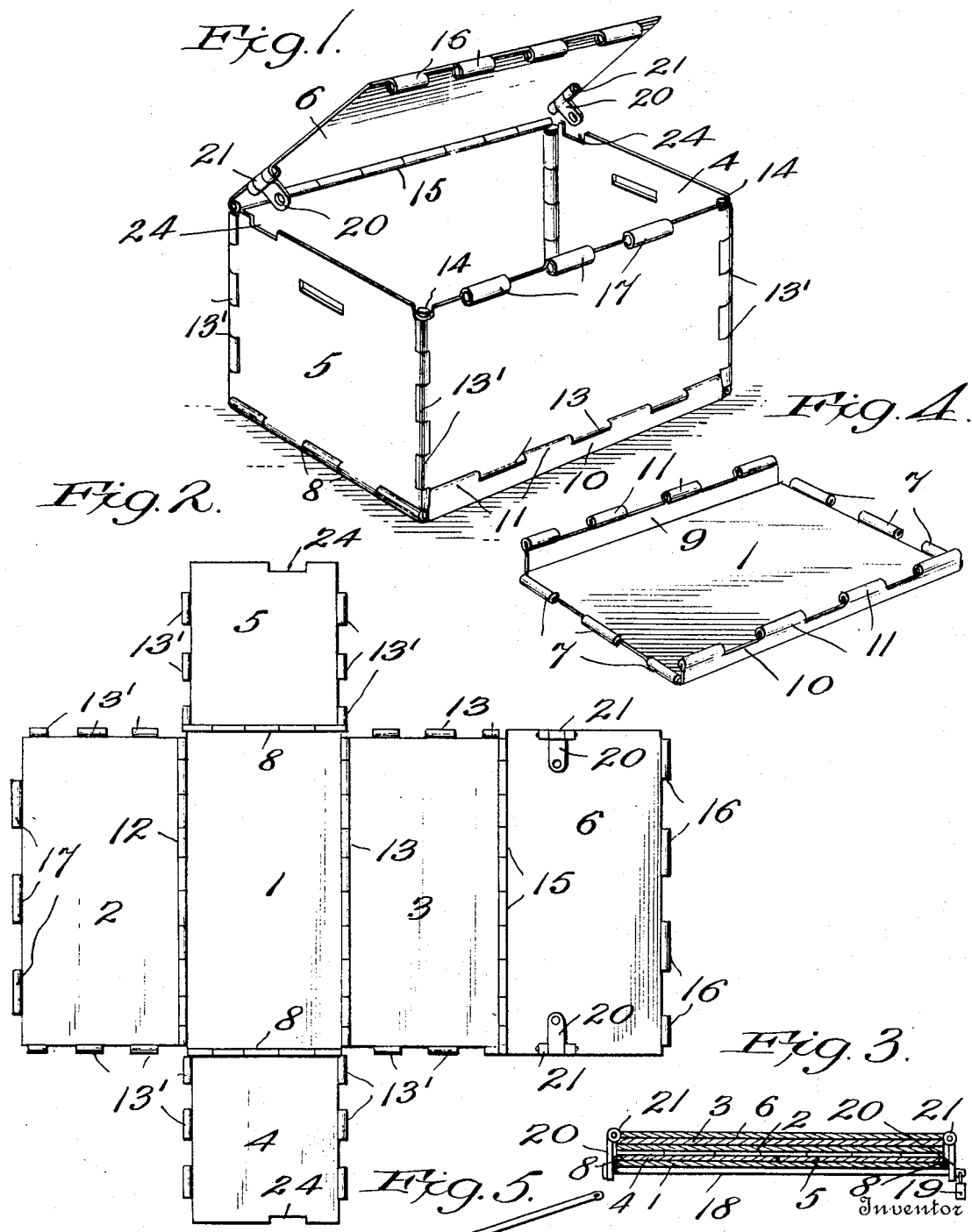

WILFRED CUNLIFFE, OF COSCOB, CONNECTICUT, ASSIGNOR OF ONE-HALF TO JOHN J. LIPTAK, OF COSCOB, CONNECTICUT.

PACKING-CASE.

1,198,524.      Specification of Letters Patent.      Patented Sept. 19, 1916.

Application filed April 12, 1913. Serial No. 760,776.

*To all whom it may concern:*

Be it known that I, WILFRED CUNLIFFE, a citizen of the United States, residing at Coscob, in the county of Fairfield and State of Connecticut, have invented new and useful Improvements in Packing-Cases, of which the following is a specification.

This invention relates to shipping crates and has for its general object to provide a simple and efficient crate which may be conveniently set up for shipping or knocked down for reshipping. And to these ends the invention consists in providing the crate with a plurality of hingedly connected sections so connected and arranged that the crate can be securely locked in either the set-up or knocked-down positions.

Other objects will appear and be better understood from that embodiment of my invention of which the following is a specification, reference being had to the accompanying drawings forming part hereof, in which:—

Figure 1 is a perspective view of the crate in its set-up position. Fig. 2 is a plan view of the crate in the knocked down position. Fig. 3 is a cross sectional view showing the crate in the knocked down and folded position ready for shipment. Fig. 4 is a detail persepctive view of the bottom of the crate, and Fig. 5 is a perspective view of locking rod.

Referring to the drawings in detail the crate comprises a bottom 1, sides 2 and 3, ends 4 and 5 and top 6, all of which are by preference made of metal, preferably galvanized iron on account of its strength and non-corrosive properties. The bottom 1 is provided on each end with the tubular beads 7 for hinging thereto as at 8, the ends of the crate and on each side the bottom is provided with the upturned flanges 9 and 10, at intervals on the length of which are formed tubular beads 11 to which are hinged as at 12 and 13, the sides of the crate. As is noted by reference to Fig. 4, the upturned flange 9 is taller than the upturned flange 10 for the purpose of providing space for the proper nesting of the sides and ends when the crate is in the knocked-down and folded position. The meeting edges of both the sides and ends of the crate are provided with the tubular beads 13' which, when the crate is in the set-up position, communicate with each other and are securely locked together by means of the detachable tie rods 14.

The top is hingedly connected to the side 3 by the hinge member 15 and is also provided with the tubular beads 16 which communicate with the tubular beads 17 mounted on the side 2 when the crate is in the set-up position. A locking rod 18 is provided for connecting the beads 16 and 17 together and for locking the top in its closed position, and to prevent the rod from becoming loosened or the crate from being tampered with during shipment, a lock 19 (see Fig. 4) is provided for securely holding the rod in position.

A pair of apertured cleats 20 hingedly connected as at 21 to the top of the crate 1 at each side thereof, is provided for the purpose of receiving the locking rod 18 when the crate is in its knocked-down and folded position as shown in Fig. 4. These cleats when the crate is in its set-up position, are adapted to be swung inwardly as shown in Fig. 1, so that they may be housed within the crate and be thereby prevented from becoming accidentally broken off or tampered with when the crate is shipped. Recesses 24 are provided in the ends 4 and 5 of the crate for the purpose of preventing the engagement of the hinged portion of the cleats with the upper edges of the crate.

When the crate is to be knocked down for reshipment, both the locking and tie rods are first withdrawn thereby separating the sides and ends. The ends 4 and 5 are then folded inwardly upon the bottom. The side 2 is then folded over the ends. The side 3 is then folded over upon the side 2 and the top is folded back upon the side 3, the cleats 20 being swung outwardly and downwardly after which the locking rod 18 is secured within the apertures of the cleats and the lock 19 secured to the end thereof. When in this position the crate is a flat structure which will be convenient to handle and which will occupy but small space when reshipped. When the crate is in set up or extended position the rod 18 may be inserted through the cleats 20 and lodged in the recesses 24 of the end walls 4 and 5 whereby the top wall 6 is held in a partially open position.

From the foregoing it will be seen that by the use of a crate as disclosed by my invention, that I have produced a thoroughly efficient article in which merchandise may be conveniently and safely shipped without liability of damage, and that the crate when emptied, may be conveniently and quickly knocked down for reshipment.

It is obvious that those skilled in the art may vary the details of construction and arrangements of parts without departing from the spirit of my invention and therefore I do not wish to be limited to such features except as may be required by the claim.

What is claimed as new is:

A crate comprising a bottom having at its edges upstanding flanges one of which is taller than the other, front and rear side walls hingedly connected with the flanges and adapted to fold upon each other over the bottom, end walls hingedly connected with the ends of the bottom and connected with the side walls and having recesses at their upper edges in the vicinity of the rear side wall, a cover hinged to the rear side wall and adapted to close the crate when set up, a freely detachable locking rod for connecting the cover to the front side wall, said rod being of a length greater than that of the crate, apertured cleats pivotally mounted on the cover and adapted to be received in the recesses of the end walls when the crate is in set up position, said locking rod when detached from the cover and side adapted to be passed through the said cleats for securing the crate in a knock down and folded position, and adapted to be inserted through the said cleats and enter the recesses to hold the cover in a partially open position when the parts of the crate are extended.

In testimony whereof I affix my signature in presence of two witnesses.

WILFRED CUNLIFFE.

Witnesses:
JOHN JOSEF LIPTAK,
GEO. A. BYRNE.